United States Patent
Schreter

(10) Patent No.: US 7,284,096 B2
(45) Date of Patent: Oct. 16, 2007

(54) SYSTEMS AND METHODS FOR DATA CACHING

(75) Inventor: Ivan Schreter, Leimen (DE)

(73) Assignee: SAP AG, Walldorf (DE)

( * ) Notice: Subject to any disclaimer, the term of this patent is extended or adjusted under 35 U.S.C. 154(b) by 278 days.

(21) Appl. No.: 10/911,716

(22) Filed: Aug. 5, 2004

(65) Prior Publication Data

US 2005/0055511 A1 Mar. 10, 2005

(30) Foreign Application Priority Data

Aug. 5, 2003 (EP) ................................. 03017835

(51) Int. Cl.
*G06F 12/00* (2006.01)
*G06F 13/00* (2006.01)
*G06F 13/28* (2006.01)

(52) U.S. Cl. ................... 711/136; 711/134; 711/159; 711/160

(58) Field of Classification Search ............... 711/134, 711/136
See application file for complete search history.

(56) References Cited

U.S. PATENT DOCUMENTS

| 5,794,229 A * | 8/1998 | French et al. ............... 707/2 |
| 6,397,296 B1 * | 5/2002 | Werner ....................... 711/122 |
| 6,490,654 B2 | 12/2002 | Wickeraad et al. ......... 711/133 |
| 6,601,143 B1 | 7/2003 | Lamparter .................. 711/134 |
| 2003/0005234 A1 * | 1/2003 | Sperber et al. ............. 711/140 |

OTHER PUBLICATIONS

Rollins Turner et al. "Segmented FIFO Page Replacement", Digital Equipment Corporation; 1981; pp. 48-51.*
C.M. May, "Management Technique for Memory Hierarchies," IBM Technical Disclosure Bulletin, vol. 24, No. 1A, Jun. 1, 1981, pp. 333-335.
O'Neill et al., "The LRU-K Page Replacement Algorithm for Database Disk Buffering," Sigmod Record, Association for Computing Machinery, vol. 22, No. 2, Jun. 1, 1993, pp. 297-306.
PCT Notification of Transmittal, including Search Report and Written Opinion, dated Sep. 21, 2004, 10 pages.

* cited by examiner

Primary Examiner—Donald Sparks
Assistant Examiner—Prasith Thammavong
(74) Attorney, Agent, or Firm—Finnegan, Henderson, Farabow, Garrett & Dunner L.L.P.

(57) ABSTRACT

Systems and methods are provided for data caching. An exemplary method for data caching may include establishing a FIFO queue and a LRU queue in a cache memory. The method may further include establishing an auxiliary FIFO queue for addresses of cache lines that have been swapped-out to an external memory. The method may further include determining, if there is a cache miss for the requested data, if there is a hit for requested data in the auxiliary FIFO queue and, if so, swapping-in the requested data into the LRU queue, otherwise swapping-in the requested data into the FIFO queue.

20 Claims, 2 Drawing Sheets

SYSTEMS AND METHODS FOR DATA CACHING

DETAILED DESCRIPTION

1. Field of the Invention

The present invention generally relates to the field of data processing and, more particularly, to systems and methods for data caching.

2. Background Information

In the art of computing, cache memories are used to store portions of the memory contents of a main memory that are likely to be used soon. As used herein, the term "cache" will also be used to refer to a cache memory. Caches are typically smaller and faster than main memory, and are used to mask latencies involved in retrieving memory operands from main memory. In modern computer systems, cache access times are typically about 500% to 3000% faster than main memory access times.

An entry of a cache is known in the art as a cache line, and typically a cache line will store a small contiguous range of main memory contents, such as 32 or 64 bytes. While cache memories are not limited to CPUs, a primary application for cache memories is to store memory operands required by one or more central processing units (CPUs). Another common use of caching is in database systems. A database system caches cache equally-sized pages or blocks of data (analogous to cache lines) from disk-based storage (analogous to main memory) in a computer's memory (which acts as the cache for the data pages from the disk).

Caches may have multiple levels. For example, a CPU may be provided with a level one (L1) cache on the same integrated circuit as the CPU, and a larger and slower level two (L2) cache in the same module as the CPU. In the discussion that follows, it will be assumed that memory operands are loaded into a cache from main memory. However, those skilled in the art will recognize that such operands may also be loaded from a higher level cache if the operands are present in the higher level cache.

Since cache memories are typically smaller than the main memories to which they are coupled, a strategy is required to determine which contents of the main memory are to be stored in the cache. This strategy usually comprises two components: a cache organization and a cache replacement algorithm. The replacement algorithm determines which cache line should be replaced when the cache (or an associative set of the cache, as described below) becomes full.

One of the simplest cache organizations is the direct-mapped cache organization. In a direct-mapped cache, a portion of the main memory address is used as an index, and the remainder of the main memory address (not including any bits of the main memory address that represent bytes within a cache line) is used as a tag. The number of bits used for the index corresponds to the size of the cache. For example, a direct-mapped cache having 64 cache lines will have an index comprising six bits. When a read operation occurs and the memory operand is not in the cache (i.e., the tag does not match), the memory operand is fetched from main memory and stored in the cache line corresponding to the index, and the tag is stored in a tag field associated with the cache line.

Assuming the memory operand is still in the cache (i.e., the tags match) the next time a read operation occurs the memory operand will be retrieved from the cache. Incidentally, the term "cache hit" is used in the art to refer to a memory access wherein the required memory operand is already in the cache, and the term "cache miss" is used in the art to refer to a memory access wherein the memory operand is not in the cache and must be loaded from main memory or a higher level cache.

The replacement algorithm used with a direct-mapped cache is trivial. For any given byte in the main memory, there is only one cache line in which the byte can be stored. Therefore, if the cache line is in use, the old contents of the cache line are simply overwritten with the new contents. The act of altering the contents of a cache line after the cache line has been loaded from memory is known in the art as "dirtying" the cache line. "Dirty" cache lines must be written back to main memory before the new contents can be stored in the cache line. If the old contents in the cache line are identical to the contents in main memory, the old contents may be overwritten without having to write back to main memory.

One problem associated with direct-mapped cache memories is that two often-used memory operands may need to be stored in the same cache line. Since the two memory operands will contend for the same cache line, much of the advantage provided by the cache will be lost as the two operands continuously replace each other.

Another cache organization is the associative cache organization. A fully-associative cache simply has a pool of cache lines, and a memory operand can be stored in any cache line. When a memory operand is stored in an associative cache, the address of the memory operand (excluding any bits representing the bytes stored within the cache line) is stored in a tag field associated with the cache line. Whenever a memory operation occurs, the tag fields associated with each cache line are searched to see if the memory operand is stored in the cache. One disadvantage of an associative cache is that all tag fields of all cache lines must be searched, and as the number of cache lines is increased, the time required to search all tag fields (and/or the complexity of the searching logic) also increases.

The set-associative cache organization is a hybrid of the direct-mapped and associative memory organizations. In a set-associative cache, an index portion of the memory address identifies a subset of the cache lines. As above, a tag field is associated with each cache line. However, only the tags of the subset of cache lines identified by the index need to be associatively searched. For example, consider a cache having 256 entries organized into 64 subsets, with each subset having four cache lines. Such a memory will have an index comprising six bits.

When a memory operation occurs, the index identifies one of the 64 subsets, and the tag fields associated with the four cache lines in the subset are searched to see if the memory operand is in the cache. The set-associative cache organization allows a cache to have many cache lines, while limiting the number of tag fields that must be searched. In addition, memory operands need not contend for the same cache line, as in a direct-mapped cache.

As used herein, the term "associative set" will be used to refer to all cache lines of a purely associative cache, and to a set of a set-associative cache. When an associative set is full and a new cache line must be stored in the associative set, an algorithm is required to determine which cache line can be replaced. Several such algorithms are known in the art. A "random" algorithm simply picks a cache line at random. While the implementation is simple, the random algorithm provides relatively poor results since there is no correspondence between the cache line contents selected for replacement and the probability that the selected contents will be needed soon.

Another algorithm is the first-in first-out (FIFO) algorithm. This algorithm treats the associative set as a circular queue wherein the cache line contents that have been in the associative set the longest are replaced. This algorithm provides better results than the random algorithm because the algorithm observes cache misses to create correspondence between the cache line selected for replacement and the probability that the cache line will be needed soon.

The algorithm works well when all memory contents needed by the CPU are loaded into the cache and other cache misses do not cause the needed memory contents to be replaced. However, the algorithm does not recognize that if a cache line is repeatedly accessed by the CPU, it should not be replaced. The only factor considered is the length of time that the memory contents have been in the cache. The algorithm is slightly more complex to implement than the random algorithm. Typically, a single counter associated with an associative set and is used to provide an index indicating which cache line is next in line for replacement, and the counter is incremented every time there is a cache miss and an operand is loaded from main memory.

Yet another algorithm is the least recently used (LRU) algorithm. As the name implies, this algorithm discards the cache line contents that were used least recently. This algorithm tends to be very effective because the algorithm observes both cache hits and cache misses to create correspondence between the cache line selected for replacement and the probability that the cache line will be needed soon. However, the algorithm is relatively complex to implement because a counter value is typically associated with each cache line.

To illustrate how the LRU algorithm functions, consider a full associative set having eight cache lines. A three-bit LRU counter value is associated with each of the cache lines and each counter value is unique, with a counter value of "000" representing the least recently used cache line and a counter value of "111" representing the most recently used cache line. When a cache miss occurs, the memory operand is loaded into the cache line having a counter value of "000," the counter value of this cache line is set to "111," and all the other counter values are decremented.

When a cache hit occurs, the counter values of all cache lines having a counter value greater than the counter value of the cache line that contains the required memory operand are decremented, and the counter value of the cache line that contains the required operand is set to "111." Clearly, the logic to implement the LRU algorithm is more complex than the logic required to implement the FIFO algorithm. Other algorithms are known in the art that approximate the LRU algorithm, but are less complex to implement. The LRU algorithm (and to a lesser extent the FIFO algorithm) work well with CPU access patterns because CPUs tend to use the same data and code several times due to loops and data manipulations.

However, LRU algorithm degenerates when accessing a big chunk of data (that doesn't fit into the cache) exactly once. In such a case, the whole data cache will be overwritten with data from this big chunk that won't be needed anymore. This case may happen quite often, for example, when computing aggregate functions on large arrays. The performance of the system is degraded in this case.

U.S. Pat. No. 6,490,654 shows a cache memory that includes a plurality of cache lines that are accessed associatively, with a count entry associated with each cache line storing a count value that defines a replacement class. The count entry is typically loaded with a count value when the cache line is accessed, with the count value indicating the likelihood that the contents of cache lines will be needed soon.

In other words, data that is likely to be needed soon is assigned a higher replacement class, while data that is more speculative and less likely to be needed soon is assigned a lower replacement class. When the cache memory becomes full, the replacement algorithm selects for replacement those cache lines having the lowest replacement class. Accordingly, the cache lines selected for replacement contain the most speculative data in the cache that is least likely to be needed soon.

U.S. Pat. No. 6,601,143 shows a self-adapting cache management method for determining an efficient cache line replacement algorithm for selecting which objects (or lines) are to be evicted from the cache. Objects are prioritized based upon weights that are determined dynamically for each object. The hit rate of the cache memory is observed during a time interval while the control parameter is set to a certain value.

The control parameter is adjusted and the hit rate is observed during a consecutive interval of time. The control parameter is then adjusted an incremental amount having a magnitude and direction determined based on whether the hit rate improved or was reduced. The control parameter may be continuously and automatically adjusted based on observed hit rates and the algorithm may include additional control parameters associated with other object attributes, which are adjusted in a similar manner.

SUMMARY OF THE INVENTION

One embodiment of the present invention provides for a method of data caching which uses both of the FIFO and LRU cache replacement algorithms. A sub-set of the cache lines may establish a FIFO queue and a disjunct sub-set of the cache lines may establish a LRU queue in the cache memory. In addition, an auxiliary FIFO queue may be established for cache lines addresses that have been swapped-out from the FIFO queue.

In case there is a cache miss for a data request, it may be determined whether there is a hit in the auxiliary FIFO queue. If this is the case, the corresponding data may be swapped-in from main memory and added to the LRU queue.

In accordance with an embodiment of the invention, both the FIFO queue and the LRU queue may have predefined maximum sizes. For example, the maximum size of the FIFO queue may be between 5% and 25%, preferably 10%, of the cache size. The maximum size of the LRU queue may be between 75% and 95%, preferably 90%, of the size of the cache.

In accordance with another embodiment of the invention, the address of an element of the FIFO queue that needs to be swapped-out from the cache memory may be swapped-in into the auxiliary FIFO queue. This way the cache hit rate can be substantially improved, since elements accessed only once need to "make it" only through the relatively small auxiliary FIFO queue and do not cause replacement of often-used elements in LRU queue, which positively impacts the overall performance of the data processing system.

In accordance with yet another embodiment of the invention, certain data may be classified as FIFO type data and other data may be classified as LRU data. When such pre-classified data is swapped-in into the cache memory the data may be directly added to its respective queue, i.e., data that is classified as FIFO type data may be added to the FIFO queue and data that is classified as LRU type data may be added to the LRU queue.

In other words, when pre-classified FIFO type data is swapped-out into memory and its address entered into the auxiliary FIFO queue and later it is swapped-in again into the cache memory it may still be added to the FIFO queue instead of the LRU queue.

It is to be noted that embodiments of the present invention are not restricted to caching of lines of a main memory. Another exemplary application is caching of database systems. In this case, equally-sized pages or blocks of data (analogous to cache lines) from disk-based storage are cached in a computer's memory which acts as the cache for the data pages from the disk.

BRIEF DESCRIPTION OF THE DRAWINGS

It is to be understood that both the foregoing general description and the following detailed description are exemplary and explanatory only and are not restrictive of the invention, as claimed. The accompanying drawings, which are incorporated in and constitute a part of this specification, illustrate several embodiments of the invention and together with the description, serve to explain the principles of the invention. In the drawings:

DESCRIPTION OF THE EMBODIMENTS

Figure 1:
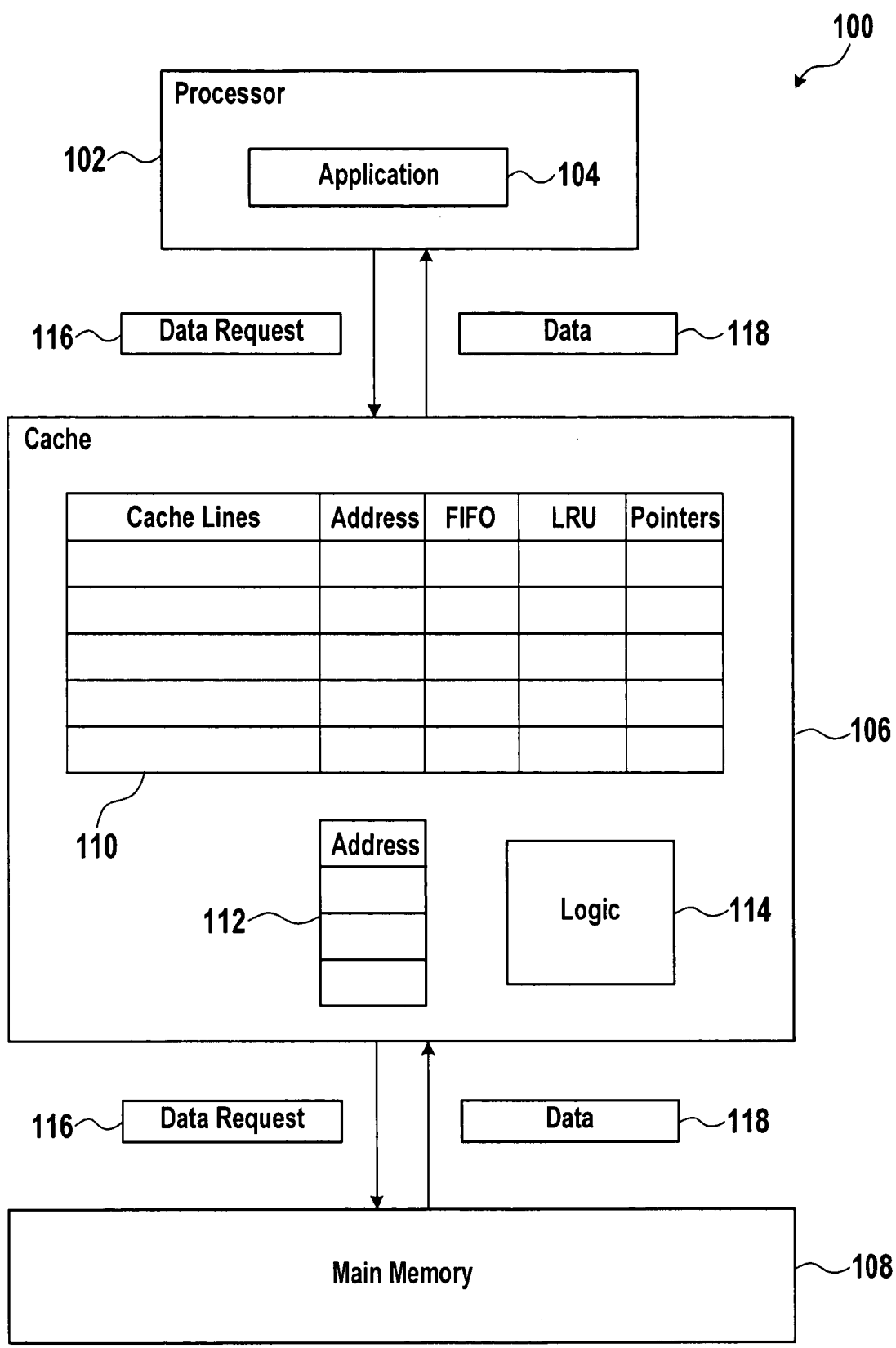
FIG. 1 is a block diagram of an exemplary data processing system, consistent with certain aspects of the invention.

FIG. 1 shows an exemplary data processing system 100, consistent with an embodiment of the invention. As illustrated in FIG. 1, data processing system 100 may include at least one processor 102 for running an application program 104. Further, data processing system 100 may have a cache module 106 for coupling of processor 102 to a main memory 108.

Cache module 106 may have a cache memory 110 for storing a number of cache lines. Each one of the cache lines stored in cache memory 110 may have the associated tags "address", "FIFO", "LRU", and "Pointers."

The tag "address" may indicate the address or page number of the data stored in the corresponding cache line. The tag "FIFO" indicates whether the cache line belongs to a FIFO queue. The tag "LRU" indicates whether the corresponding cache line belongs to a LRU queue.

"Pointers" points to the next and previous element in the respective queue. If the cache line belongs to the FIFO queue, "Pointers" has one pointer which points to the next and one pointer which points to the previous cache line of the FIFO queue. Likewise, if the cache line belongs to the LRU queue, "Pointers" has two pointers pointing to the next and previous element of the LRU queue. This way a doubly-linked list may be created for both the FIFO and the LRU queue. A doubly-linked list has the advantage of fast unchaining in LRU case.

Further, cache module 106 may have an auxiliary memory 112 for storage of an auxiliary FIFO queue of addresses of cache lines. Each item of the auxiliary FIFO queue may contain address and/or page number information in the same way as the cache lines stored in cache memory 110. In the following, the auxiliary FIFO queue will be referred to as hot FIFO queue. It is to be noted that auxiliary memory 112 may only store the addresses of the elements of the hot FIFO queue, but not the cache lines themselves which may be stored in main memory 108.

Cache memory 110 and auxiliary memory 112 can be realized by the same physical memory device or by separate memory components. For example, auxiliary memory 112 can be realized as a dedicated FIFO storage component.

Further, cache module 106 may have logic circuitry 114 for controlling the data caching. Logic circuitry 114 can be hardwired logic or it can run a program for controlling of the data caching or a combination of both.

In operation, data is swapped-in from main memory 108 into cache memory 110. A first subset of the cache lines stored in cache memory 110 may establish the FIFO queue, whereas a disjunct second sub-set of the cache lines stored in cache memory 110 may establish the LRU queue.

In operation, the following situation can occur: a data request 116 may be received by cache module 106 from application program 104. In response, logic circuitry 114 may check if there is a cache hit in cache memory 110. If this is not the case, cache memory 112, i.e., the hot FIFO, may be checked for a hit. If there is a hit in cache memory 112, the corresponding cache line may be swapped-in to cache memory 110 from main memory 108 and may be added to the LRU queue. When the cache line is swapped-in from main memory 108 into cache memory 110 the corresponding tags may also be stored, e.g., the "address" tag, the "LRU" tag and the "pointers" from the swapped-in cache line to the next and previous elements of the LRU queue.

If the requested data address is not found in auxiliary memory 112, data request 116 may be forwarded to main memory 108 and data 118 may be swapped-in from main memory 108. Data 118 may be stored in cache memory 110 as a new element of the FIFO queue by definition. If the FIFO queue is full, this requires that the last element of the FIFO queue is swapped-out into main memory 108 and its address may be entered into auxiliary FIFO queue 112.

In one embodiment, the maximum size of the FIFO queue may be set to a level between, for example, 5% and 25% of the storage capacity of cache memory 110.

Figure 2:
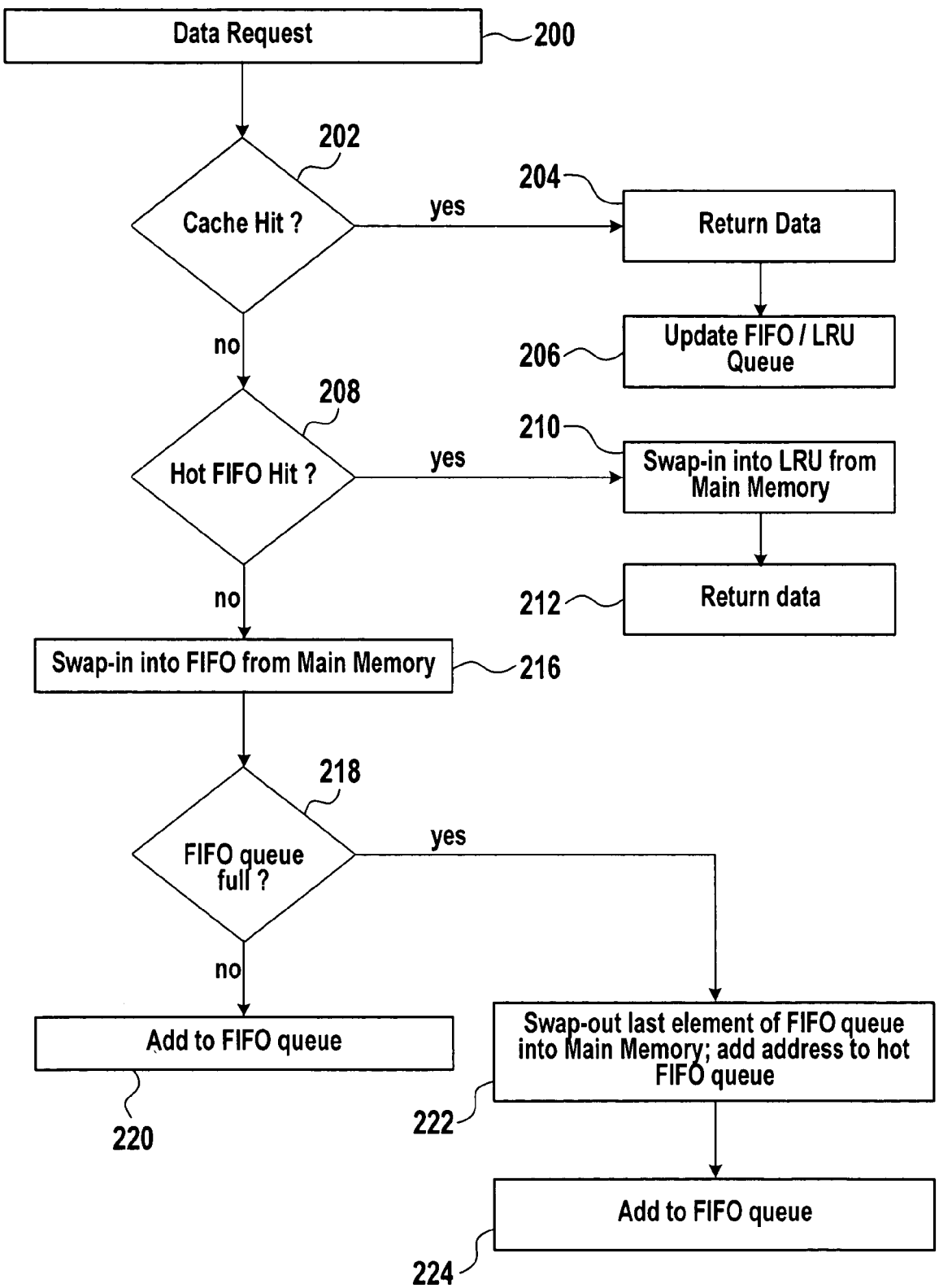
FIG. 2 is illustrative of a flow chart of an exemplary method for performing data caching, consistent with certain aspects of the invention.

FIG. 2 shows a flow chart for an exemplary method for performing data caching, in accordance with an embodiment of the invention. In step 200, a data request may be received by the cache module. In step 202, by way of example, logic 114 (FIG. 1) may determine if there is a cache hit for the data request. If so, the corresponding data may be returned to the requester in step 204, e.g., the requesting application program. In step 206, by way of example, logic 114 may update the respective queue. If the requested cache line for which the cache hit occurred is an element of the FIFO queue, nothing may have to be done. If the cache line for which the cache hit occurred is an element of the LRU queue, the LRU queue may be updated in accordance with the LRU algorithm in step 206.

If it is determined in step 202 (e.g., by logic 114), that a cache miss occurred, the control may go to step 208. In step 208, logic 114 may determine whether the requested data address is stored in the hot FIFO (e.g., auxiliary memory 112 of FIG. 1). If there is a hot FIFO hit, the requested data may be swapped-in to the cache from main memory and may be entered into LRU queue in step 210. Next, the data may be returned to the requestor in step 212. In one embodiment, logic 114 may perform steps 210, 212, and 214.

If the LRU queue is full in step 210, the last element of LRU queue may need to be swapped-out to main memory in order to free space for the new requested data.

If there is a hot FIFO miss in step 208, the control may go to step 216 in order to swap-in the requested data from main memory. In step 218, logic 114 may determine whether the FIFO queue of the cache memory has reached its maximum size. If this is not the case, the data that is swapped-in in step 216 may be added to the FIFO queue of the cache memory in step 220 in accordance with the FIFO algorithm. In one embodiment, logic 114 may perform steps 216, 218, and 220.

If the FIFO queue is full, the control may go to step 222. In step 222, the first element of the FIFO queue may be swapped-out into main memory and its address is entered into the hot FIFO by logic 114, for example. This may cause dropping of the first element of hot FIFO in case hot FIFO was full. Next, the data that is swapped-in in step 216 may be added to FIFO queue of the cache memory in accordance with FIFO algorithm in step 224 by logic 114, for example.

As a result of the method of FIG. 2, the data that is frequently used is likely to belong to the LRU queue, whereas data that is less frequently used is likely to belong to the FIFO queue. As a result, the overall hit rate increases, which positively impacts the performance of the data processing system.

One skilled in the art will appreciate that the features of the present disclosure may be implemented in various data processing systems to provide data caching. Such environments and applications may be specially constructed for performing the various processes and operations of the disclosure or they may include a general-purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

What is claimed is:

1. A method of data caching, comprising:
   establishing a FIFO queue and a LRU queue in a cache memory;
   establishing an auxiliary FIFO queue for addresses of cache lines which have been swapped-out to an external memory;
   when there is a cache miss for an address for requested data:
      determining if there is a hit for the address for the requested data in the auxiliary FIFO queue, and if there is a hit for the address for the reguested data in the auxiliary FIFO queue, swapping-in the requested data into the LRU queue from the external memory, and
      when there is a cache miss for the address for the requested data in the auxiliary FIFO queue, swapping-in the requested data into the FIFO queue; and
   when there is a cache hit for the address for the requested data, returning the requested data.

2. The method of claim 1, wherein the FIFO queue has a first predefined maximum size and the LRU queue has a second predefined maximum size, and further wherein the first predefined maximum size is below the second predefined maximum size.

3. The method of claim 1, wherein the following steps are carried out if there is a miss in the auxiliary FIFO queue:
   swapping-in the requested data from the external memory;
   adding the swapped-in data to the FIFO queue; and
   swapping-out an address for an element from the FIFO queue into the auxiliary FIFO queue if the FIFO queue has reached a pre-defined maximum size.

4. The method of claim 1, wherein a predefined maximum size of the FIFO queue is between 5% and 25% of the size of the cache memory.

5. The method of claim 4, wherein the predefined maximum size of the FIFO queue is 10% of the size of the cache memory.

6. The method of claim 1, wherein a predefined maximum size of the LRU queue is between 75% and 95% of the size of the cache memory.

7. The method of claim 6, wherein the predefined maximum size of the LRU queue is 90% of the size of the cache memory.

8. A cache memory storing computer-readable instructions for performing a method of data caching, the method comprising:

establishing a FIFO queue and a LRU queue;
establishing an auxiliary FIFO queue for addresses of cache lines which have been swapped-out to an external memory;
determining if there is a hit corresponding to an address for requested data in the auxiliary FIFO queue and when there is a hit corresponding to the address for the requested data in the auxiliary FIFO queue, swapping-in the requested data into the LRU queue from the external memory in case of the hit; and
determining if there is a hit for the requested data in the auxiliary FIFO queue when there is a cache miss for the address for the requested data.

9. The cache memory of claim 8, wherein the FIFO queue has a first predefined maximum size and the LRU queue has a second predefined maximum size, and further wherein the first predefined maximum size is below the second predefined maximum size.

10. The cache memory of claim 8, the method further comprising:
swapping-in the requested data from the external memory if there is a miss corresponding to the requested data in the auxiliary FIFO queue;
adding the swapped-in data to the FIFO queue; and
swapping-out an element from the FIFO queue into the external memory and putting the element's address into the auxiliary FIFO queue, if the FIFO queue has reached a predefined maximum size.

11. The cache memory of claim 8, wherein a predefined maximum size of the FIFO queue is between 5% and 25% of the size of the cache memory.

12. The cache memory of claim 11, wherein the predefined maximum size of the FIFO queue is 10% of the size of the cache memory.

13. The cache memory of claim 8, wherein a predefined maximum size of the LRU queue is between 75% and 95% of the size of the cache memory.

14. The cache memory of claim 13, wherein the predefined maximum size of the LRU queue is 90% of the size of the cache memory.

15. A data processing system comprising:
at least one processor for running an application program;
an external memory; and
a cache memory coupled to the processor and the external memory, the cache memory storing computer-readable instructions for performing a method of data caching, the method comprising:
establishing a FIFO queue and a LRU queue;
establishing an auxiliary FIFO queue for cache line addresses which have been swapped-out to an external memory;
determining if there is a hit corresponding to an address for requested data in the auxiliary FIFO queue and when there is a hit corresponding to the address for the requested data in the auxiliary FIFO queue, swapping-in the requested data into the LRU queue from the external memory in case of the hit; and
determining if there is a hit for the requested data in the auxiliary FIFO queue when there is a cache miss for the address for the requested data.

16. The data processing system of claim 15, wherein the external memory is at least one of a main memory and a disk-based storage device.

17. The data processing system of claim 16, wherein the cache lines are at least one of equally-sized pages and blocks of data from a database.

18. The method of claim 1, wherein the external memory is a disk-based storage device.

19. The method of claim 1, wherein the external memory is main memory associated with at least one processor.

20. The method of claim 1, wherein the cache memory is set-associative.

* * * * *